Aug. 30, 1949.　　　　　E. S. FRASER　　　　　2,480,407
PARACHUTE APPARATUS
Filed March 1, 1946　　　　　　　　　　　　　　3 Sheets—Sheet 2
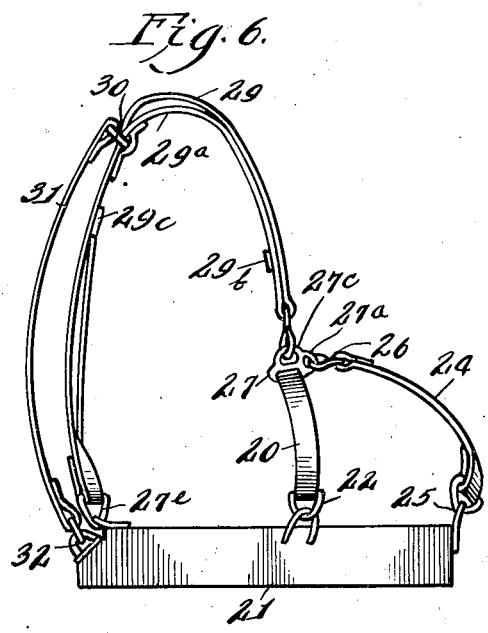
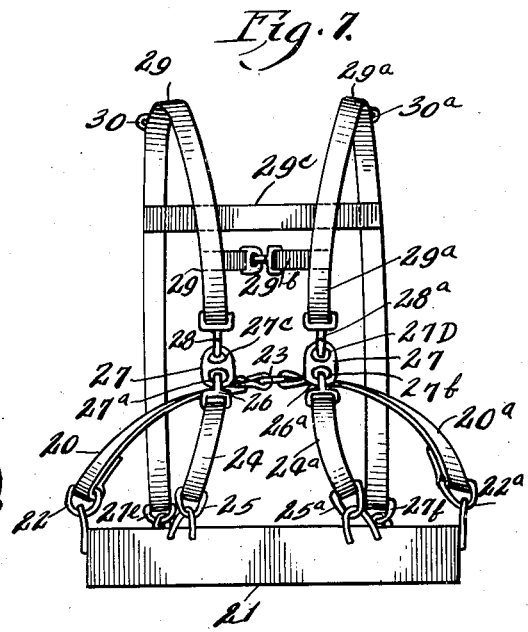
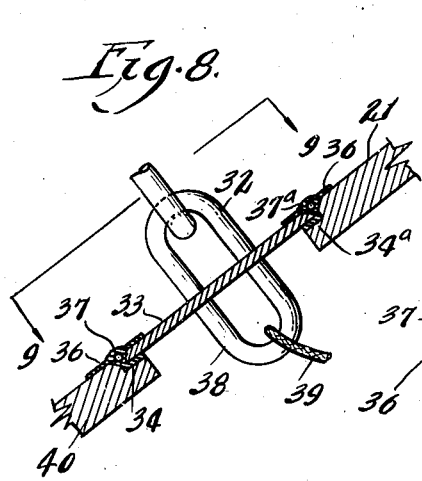
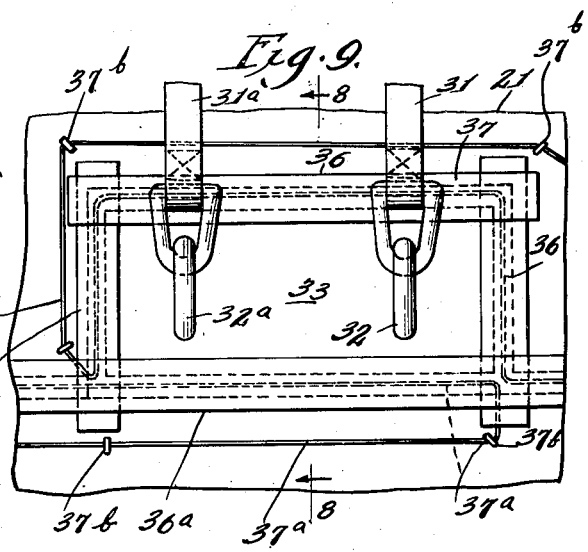
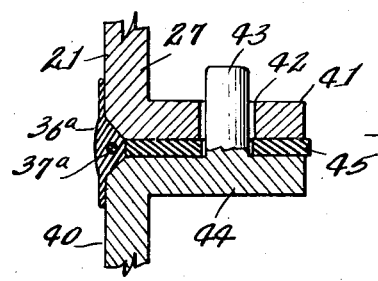
Inventor:
Edward S. Fraser.
By Chritton, Schroeder
Merriam & Lofgren
Attorneys.

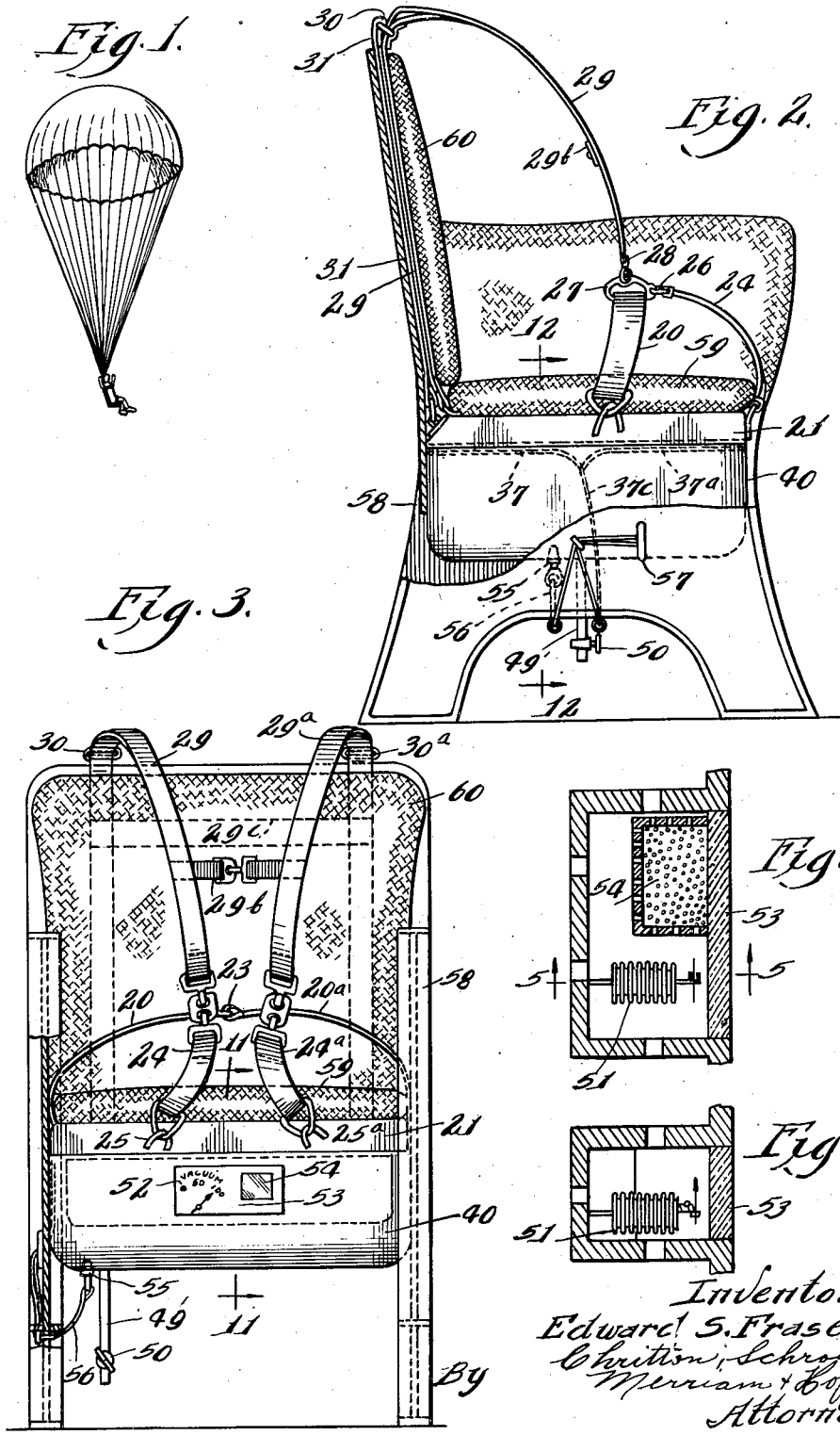

Aug. 30, 1949.   E. S. FRASER   2,480,407
PARACHUTE APPARATUS
Filed March 1, 1946   3 Sheets-Sheet 3
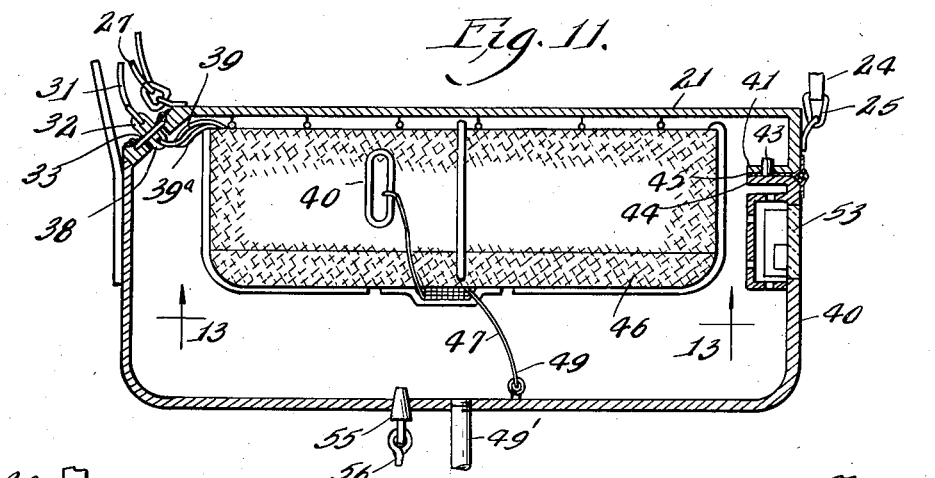
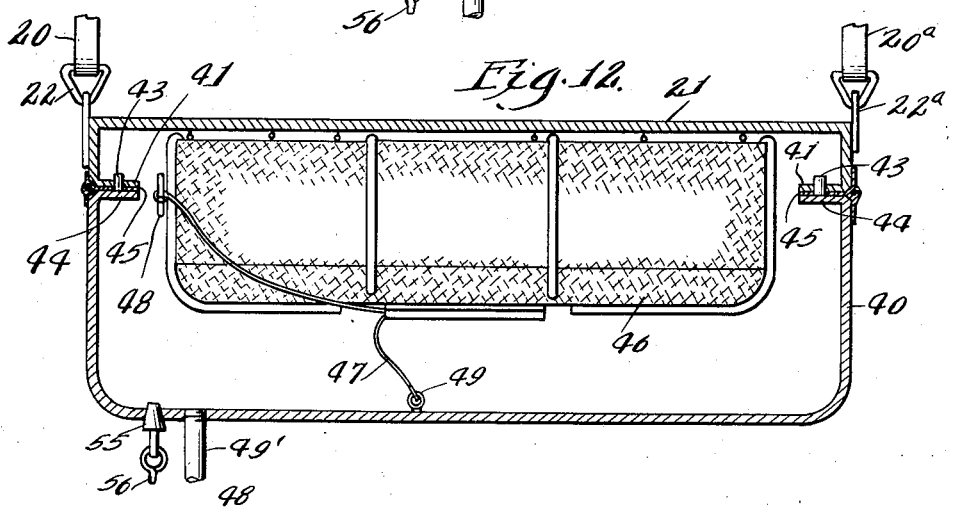
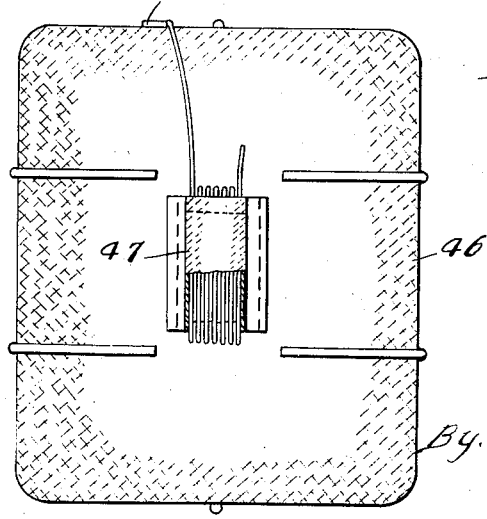
Inventor:-
Edward S. Fraser
By Chritton, Schroeder, Merriam & Hofgren
Attorneys Patented Aug. 30, 1949

2,480,407

UNITED STATES PATENT OFFICE 2,480,407

PARACHUTE APPARATUS

Edward S. Fraser, Chicago, Ill.

Application March 1, 1946, Serial No. 651,089

13 Claims. (Cl. 244—141)

My invention relates to a parachute apparatus and more particularly to a method and apparatus for storing a parachute in a manner to improve its availability for use.

One of the features of my invention is that it provides a method for the storing of a parachute in a hermetically sealed container from which fluids deleterious to parachute fabrics have been removed.

Another feature of my invention is that it provides a parachute ready for immediate use.

Yet another feature of my invention is that the parachute is not sat upon or leaned against by the user, thereby increasing the comfort and also eliminating wear on the parachute, the arrangement being such that the parachute is invisible to the wearer before the necessity for its use arises, eliminating any unnerving reaction on the passenger by the adjustment to him of the parachute harness.

A further feature of my invention is to provide visible means of ascertaining the condition in the hermetically sealed container in which the parachute is stored.

Other features and advantages of this invention will be aparent from the following specification and drawings, in which:

Figure 1 shows the parachute open and operating after the wearer thereof has left the aircraft; Figure 2 is a side elevation partly in section of an aircraft chair provided with a preferred embodiment of my invention; Figure 3 is a front elevation partly in section of the chair of Figure 2; Figure 4 is a horizontal section of the condition indicating unit showing a pressure gauge and moisture indicating substance; Figure 5 is a vertical section of Figure 4 along the line 5—5; Figure 6 is a side elevation of the parachute harness and seat member of the chair; Figure 7 is a front elevation of the parachute harness and seat member shown in Figure 6; Figure 8 is an enlarged sectional view along lines 8—8 of Figure 9; Figure 9 is a rear elevation partly in section of the rear portion of the seat member; Figure 10 is a vertical cross section of the junction of the seat member and the parachute container showing a gasket seal and vertical pins; Figure 11 is a cross section along the lines 11—11 of Figure 3; Figure 12 is a cross section along the lines 12—12 of Figure 2; and Figure 13 is a view of the bottom of the parachute showing the static cord attached thereto.

The carrying of parachutes for the use of passengers on commercial airlines has been uncommon for numerous reasons. The most important reasons have been, first, because of the lack of time to adjust parachutes to passengers after an emergency requiring their use has arisen. Second, because of the possible unnerving effect upon the passenger if the parachute were adjusted to him as he takes his seat. Third, because of the discomfort occasioned by sitting upon a parachute of the seat pack type or leaning against a back pack parachute. Fourth, the wear and tear upon the parachute would be considerable and its being exposed to the air which generally contains fluids deleterious to parachute fabrics, such as water vapor, acid fumes and the like, would necessitate its being repacked at least every sixty days in order to insure its operating condition.

The use of parachutes by passengers and pilots of private aircraft is infrequent, due in part to the reasons applicable to commercial airlines and the further reason of the expense involved in the repacking of a parachute every sixty days.

My invention eliminates all of the above objections in a novel manner. The parachute is stored in a sealed container from which fluids deleterious to parachute fabrics have been removed and, therefore, need not be repacked for long periods of time, and being in a sealed container, it is invisible to the passenger. In the preferred embodiment of my invention, the parachute is fastened to the underside of the seat member of the aircraft chair, which seat member forms the top of a hermetically sealed chamber. The parachute being fastened to the under-portion of the seat member is neither sat upon nor leaned against, and hence, is not subject to the wear it would otherwise receive nor does its location detract from the comfort of the seat.

Referring to Figures 6 and 7, the seat belt 20 and 20a is secured to the sides of the primary detachable portion of the chair, the metal seat member 21, in any convenient manner such as by the eyes 22 and 22a as shown. The opposite ends of the seat belt are fastenable together over the center of the seat and the wearer's lap by a snap or buckle 23. Two leg straps 24 and 24a are secured to the front of the metal seat member 21, as by the eyes 25 and 25a, the opposite ends of the said leg straps being provided with snaps 26 and 26a for attachment to the eyes 27a and 27b of the metal fittings 27 secured on the seat belt. Attachable to the eyes 27c and 27d of the metal fittings 27 are the snaps 28 and 28a to which are secured the ends of the shoulder straps 29 and 29a. The shoulder straps are of sufficient length to fit over the wearer's shoulders and are fastened at the opposite ends to the rear portion of the seat member 21 as by eyes 27e and 27f as shown. Additional straps, such as 29b and 29c may be provided for additional security of the parachute harness. Secured to the upper rear portion of each shoulder strap are the eyes 30 and 30a to which are fastened the lift webs 31 and 31a. The lift webs are somewhat longer than the distance between the eyes 30 and 30a to 32 and 32a, leaving some slack in the lift webs so that the force of a harsh landing wherein the passenger is thrown violently forward is absorbed by the shoulder straps. The opposite ends of the lift webs 31 and 31a are secured to the eyes 32 and 32a (Figure 9), which in turn are fastened to a secondary detachable portion of the chair, the metal plate 33. Plate 33 is of rectangular shape, fitting over an opening of similar shape in the rear portion of seat member 21, its bottom edge engaging the parachute container 40 as shown in Figure 11. To facilitate an airtight fit of plate 33 over the opening in the seat member 21 and its junction with parachute container 40, recesses 34 and 34a are provided in the seat member 21 and parachute container 40 (Figure 8) and an airtight plastic seal 36 encloses the boundaries of plate 33 on three sides as shown. Embedded in said plastic seal is the wire 37 positioned to rupture seal 36 upon being pulled (wire 37 may be omitted, the force of the opening of the parachute being sufficient to break seal 36). On the inside of plate 33, opposite eyes 32 and 32a, two eyes are secured (only one of which, 38, is shown) to which the parachute risers 39 and 39a are secured (Figure 11).

The seat member 21 forms the top of the parachute container 40 (Figures 11 and 12) and is provided along both sides and the front thereof with an inwardly projecting shoulder 41 with holes 42 formed therein to receive pins 43 on a similarly inwardly projecting shoulder 44 on the parachute container 40. Gasket 45 (Figure 10) facilitates an airtight fit between the seat member 21 and the container 40. An airtight plastic seal 36a (Figures 9 and 10) extends completely around the parachute container at the junction of said parachute container and the seat member (thereby covering the fourth side of plate 33) and wire 37a is embedded therein in a position to rupture seal 36a upon being pulled. Fastened to the underside of seat member 21 is the parachute pack 46 enclosing the parachute. Loops of the static cord 47 are lightly attached to the parachute pack, one end of the static cord being secured to the parachute release ring 48 and to the rip cord locking pins on the parachute pack, and the opposite end being secured to the parachute container 40, as by eye 49. The static cord is of sufficient length to permit the wearer of the parachute to walk to the exit of the airplane and to fall sufficiently far before the parachute is opened to avoid any possibility of the parachute fouling the aircraft. The combination of seat member 21, plate 33 and the parachute container 40 presents an airtight compartment from which the air can be evacuated by a vacuum pump (not shown) attached to pipe 49' which opens into the parachute container 40. When the desired vacuum has been obtained, the opening in pipe 49' can be closed by valve 50. The pins 43 fitting into holes 42, as hereinabove described, will absorb any horizontal thrust tending to separate seat member 21 and parachute container 40 and the vacuum maintained in the parachute container will resist any vertical thrust. The condition of the vacuum in the parachute container 40 may be visually checked by means of the condition indicating unit positioned inside the parachute container comprising a pressure gauge 51 (Figures 4 and 5) whose dial 52 is visible from a position in front of the seat through window 53 (Figure 3). Also visible through said window is a moisture indicating substance, such as silica gel, the discoloration of which indicates moisture in the parachute container.

Plug 55 is fitted into a hole at the bottom of the parachute container 40 (Figures 11 and 12) making an airtight fit therewith and wire 56 is attached at one end to plug 55 and at the other end to handle 57 (Figure 2). Also attached to handle 57 are wires 37 and 37a, said wires being united to a single wire 37c near the handle 57 and being led through eyes 37b (Figure 9) affixed to the metal seat member 21 prior to being embedded in the plastic seals 36 and 36b as hereinabove described. The eyes 37b are lightly attached so that they will pull off when the wires 37 and 37a are pulled.

Figures 2 and 3 show an aircraft chair generally designated 58 with my invention as a part thereof. The seat member 21 is covered by a seat cushion 59, straps 29 and 29a and 31 and 31a being passed behind a back cushion 60. Handle 57 is conveniently positioned on the side of the seat. The parachute container 40 is an integral part of the seat.

Having described my invention, its operation will now be explained. The parachute pack 46 containing the parachute is attached to the under side of the metal seat member 21, and said seat member and plate 33 are placed over the parachute container 40; the plastic seals 36 and 36a are applied to the boundaries of the metal seat member and the parachute container and also to the boundaries of plate 33, and wires 37 and 37a are positioned in the said seals. By means of a vacuum pump the air is evacuated from the parachute container by means of pipe 49' and valve 50. The vacuum obtained by the pump may be maintained or may be at least partly relieved by the introduction to the parachute container through valve 50 and pipe 49' of a gas free from fluids deleterious to parachute fabrics, such as nitrogen. The condition of the vacuum in the parachute container can be checked from time to time visually by an inspection of gauge 52 and the presence of any moisture will be indicated by a discoloration of the moisture indicating substance 54. The parachute should be repacked within 60 days after indications of the loss of vacuum or presence of moisture in the parachute container.

With the passenger (or pilot, as might be the case in a private plane) seated in chair 58 with the seat belt 20 and 20a fastened across his lap and the leg straps 24 and 24a brought up through the inside of the legs and secured to eyes 27a and 27b and the shoulder straps 30 and 30a brought over the wearer's shoulder and secured to eyes 27c and 27d, the parachute is ready for instant use.

In the event of emergency where the use of a parachute becomes essential, handle 57 will be pulled either by the individual or by a general system installed in the aircraft. The pull of handle 57 by means of wire 56 pulls plug 55 out of its position in the parachute container destroying the vacuum existing in that container, and the pull exerted upon wire 37c, and hence on wires 37 and 37a, ruptures the plastic seals 36 and 36a, releasing seat member 21 from the parachute container 40. The wearer may then rise, walk to the exit of the plane and leap to safety, the parachute being opened automatically by the static cord 47 when the wearer is at a safe distance from the aircraft. In the event that automatic opening of the parachute is not desirable, then static cord 47 may be cut and the parachute opened manually by a pull on the ring 48.

It is clear that while the preferred embodiment of my invention shows the sealed container as part of the seat, it can be part of the back of the chair or even completely separate therefrom, as in the floor, ceiling or walls of the aircraft.

While I have shown and described certain embodiments of my invention, it is to be understood that it is capable of many modifications. Changes, therefore, in the construction and arrangement may be made without departing from the spirit and scope of the invention as described in the appended claims.

I claim:

1. In an aircraft, a chair having a detachable portion, a hermetically sealed container, a parachute in the sealed container, and a parachute harness attached to the detachable portion and to the parachute.

2. In an aircraft, a chair having a detachable portion, a sealed container comprising in part the detachable portion, a parachute in the container, and a parachute harness attached to the detachable portion and to the parachute.

3. In an aircraft, a chair having a detachable portion, a sealed container comprising in part the detachable portion, a parachute in the container, a parachute harness attached to the detachable portion and to the parachute, and release means for releasing the detachable portion.

4. In an aircraft, a chair having a detachable portion, a hermetically sealed container comprising in part the detachable portion, a parachute in the container, a parachute harness attached to the detachable portion and to the parachute, release means for releasing the detachable portion, and means for indicating a condition within the said container.

5. In a chair for aircraft, primary and secondary detachable portions, a sealed container having at least one of said portions as part thereof, a parachute harness attached to the primary detachable portion with lift webs attached to the secondary detachable portion, a parachute in a pack attached to the primary detachable portion with risers attached to the secondary detachable portion, and release means for releasing at least one of said detachable portions.

6. In an aircraft, a chair having a detachable seat member, a sealed container having as its top the detachable seat member, a secondary detachable portion attached to the container and seat member, a parachute in the container with risers attached to the secondary detachable portion, a parachute harness attached to the seat member with lift webs attached to the secondary detachable portion, release means for releasing at least one of said detachable portions, and a static cord attached to the parachute for the automatic opening thereof.

7. In an aircraft, a chair having a detachable seat member, a sealed container having as its top the seat member, a parachute in the container attached to the seat member, and release means for releasing the seat member from the container.

8. In an aircraft, a hermetically sealed container having a detachable portion, a parachute in the sealed container attached to the detachable portion, a parachute harness outside of the container and attached to the detachable portion, and release means for releasing the detachable portion.

9. A hermetically sealed container having two portions detachable from each other; a parachute within said sealed container attached to one of said portions; a harness outside of said container and attached to said portion to which said parachute is attached; and release means for detaching one portion of said container from the other portion.

10. A hermetically sealed container having two portions, one being releasable from the other to open the container; a parachute within the container attached to one of said portions; a harness outside of said container and attached to said portion to which said parachute is attached; and release means for releasing one portion of said container from the other portion to open the container.

11. In a parachute device, a hermetically sealed container, a parachute packed within said container including a canopy and a connector for attachment to a load extending through said container and connected to said canopy, and means for opening said container to permit the parachute to deploy therefrom.

12. In a parachute device, a hermetically sealed container, a parachute packed within said container including a canopy and a connector for attachment to a load extending through said container and connected to said canopy.

13. In a parachute device, a hermetically sealed parachute container, a parachute packed in said container, a load connector attached to said parachute and extending thru said container in sealed relation thereto and means for opening said container to permit said parachute to deploy therefrom, said container having an atmosphere therein in which said parachute is located substantially free from substances deleterious to said parachute.

EDWARD S. FRASER.

REFERENCES CITED

The following references are of record in the file of this patent:

UNITED STATES PATENTS

| Number | Name | Date |
|---|---|---|
| 1,458,586 | McCrosson | June 12, 1923 |
| 1,795,168 | Habermehl | Mar. 3, 1931 |
| 1,817,725 | Van Horn | Aug. 4, 1931 |
| 1,843,234 | Karnes | Feb. 2, 1932 |
| 1,847,189 | Lindstrom | Mar. 1, 1932 |
| 1,934,585 | Brady | Nov. 7, 1933 |
| 2,380,372 | Alderfer | July 31, 1945 |
| 2,382,442 | Rich | Aug. 14, 1945 |
| 2,383,293 | Dearstyne | Aug. 21, 1945 |
| 2,467,024 | Frieder et al. | Apr. 12, 1949 |

FOREIGN PATENTS

| Number | Country | Date |
|---|---|---|
| 331,810 | Italy | Nov. 16, 1935 |